(12) United States Patent
Gresset et al.

(10) Patent No.: US 8,594,656 B2
(45) Date of Patent: Nov. 26, 2013

(54) METHOD AND A DEVICE FOR SELECTING AT LEAST ONE WIRELESS TELECOMMUNICATION DEVICE FOR A COORDINATION SESSION

(75) Inventors: Nicolas Gresset, Rennes Cedex (FR);
Herve Bonneville, Rennes Cedex (FR);
Mourad Khanfouci, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 495 days.

(21) Appl. No.: 12/902,512

(22) Filed: Oct. 12, 2010

(65) Prior Publication Data

US 2011/0105106 A1    May 5, 2011

(30) Foreign Application Priority Data

Oct. 29, 2009    (EP) .................................... 09174532

(51) Int. Cl.
*H04W 24/00*    (2009.01)
(52) U.S. Cl.
USPC .......................... 455/422.1; 370/331; 709/227
(58) Field of Classification Search
CPC .......... H04W 72/042; H04W 72/0413; H04W 72/04
USPC ............... 455/422.1, 450, 524; 370/329, 431, 370/331, 328; 709/227, 217
See application file for complete search history.

(56) References Cited

U.S. PATENT DOCUMENTS

| | | | |
|---|---|---|---|
| 2005/0096055 A1* | 5/2005 | Colban et al. ................. | 455/442 |
| 2005/0197132 A1* | 9/2005 | Lee et al. ...................... | 455/450 |
| 2005/0288023 A1* | 12/2005 | Kim et al. ..................... | 455/439 |
| 2006/0030309 A1* | 2/2006 | Lee et al. ................... | 455/422.1 |
| 2008/0080388 A1 | 4/2008 | Dean et al. | |
| 2008/0219286 A1* | 9/2008 | Ji et al. .......................... | 370/445 |
| 2009/0046683 A1 | 2/2009 | Jung et al. | |
| 2010/0323749 A1* | 12/2010 | Lee et al. ...................... | 455/524 |
| 2011/0070907 A1* | 3/2011 | Chou ............................ | 455/507 |

FOREIGN PATENT DOCUMENTS

EP    1073216 A2 *    1/2001

OTHER PUBLICATIONS

"Discussions on DL CoMP for LTE-A," Fujitsu, 7.5, 3GPP TSG-RAN WG2 Meeting #67, R2-095839, XP050390316, Aug. 2009, pp. 1-7.
"3rd Generation Partnership Project; Technical Specification Group Radio Access Network; Further Advancements for E-UTRA Physical Layer Aspects (Release 9)," 3GPP TR 36.814 V0.4.1(Feb. 2009), XP050380817, Feb. 2009, 31 pages.
European Search Report issued Jun. 16, 2010, in European Patent Application No. 09174532.3, filed Oct. 29, 2009.

* cited by examiner

*Primary Examiner* — Phuoc Doan
(74) *Attorney, Agent, or Firm* — Oblon, Spivak, McClelland, Maier & Neustadt, L.L.P.

(57) ABSTRACT

The present invention concerns a method for determining if a collaboration session may be established between a first wireless telecommunication device and a second wireless telecommunication device of a wireless cellular telecommunication network. The second wireless telecommunication device:
  receives through the telecommunication network, a message comprising at least one information representative of a time to transfer or receive a predetermined radio signal by the second wireless telecommunication device,
  determines at least from time of reception of the message and from the time to transfer or receive the predetermined radio signal if a collaboration session between the first and the second wireless telecommunication may be established.

15 Claims, 6 Drawing Sheets

METHOD AND A DEVICE FOR SELECTING AT LEAST ONE WIRELESS TELECOMMUNICATION DEVICE FOR A COORDINATION SESSION

FIELD OF THE INVENTION

The present invention relates generally to a method and a device for selecting, by a wireless telecommunication device of a wireless cellular telecommunication network, at least another wireless telecommunication device for a coordination session with the wireless telecommunication device.

BACKGROUND OF THE INVENTION

In classical wireless cellular telecommunication networks, the base stations are managed and configured by operation and maintenance entities. The base stations are installed in locations according to radio network planning tools predictions to fulfil as much as possible operator's radio coverage expectations.

The communication network linking the base stations is then designed and deployed to provide enough capacity to these base stations.

With such control of the topology of the wireless cellular telecommunication network, it is possible to set up coordination sessions, such as transmitting a flow of data from two base stations to one mobile terminal or to exchange scheduling information such that a mobile terminal handled by a base station will be less interfered by another base station. These coordination session as named also CoMP (Coordinated Multi-Point) transmissions.

The introduction of mechanisms allowing base stations to autonomously discover their neighbours from the radio point of view gives more flexibility to the operator for the base stations deployment.

However, the neighbourhood discovery is limited to radio aspects, and this will not be enough when coming to Coordinated Multi-Point requirements. This is particularly relevant when base stations are femto-base stations, or home base stations, since the operator does not have the control of the base stations locations nor of the communication network linking them.

Moreover, those base stations are likely to build a very dynamic set, with base stations popping-up or disappearing often in an uncontrolled manner.

With such dynamic configurations and the introduction of new wireless telecommunication devices such as home base stations, it is difficult to initiate coordination sessions between wireless telecommunication devices.

The patent application US 2009/0046683 discloses peer to peer communication between two mobile terminals.

The patent application US2008/0080388 discloses a method of an access point suppressing probe responses.

SUMMARY OF THE INVENTION

The present invention aims at providing a solution which enables wireless cellular telecommunication networks comprising wireless telecommunication devices like home base stations, relays or base stations to be involved into coordination sessions even if the topology of the wireless cellular telecommunication network is variable and even if the performance of the communication network linking the wireless telecommunication devices is variable and/or unknown.

To that end, the present invention concerns a method for determining if a collaboration session may be established between a first wireless telecommunication device and a second wireless telecommunication device of a wireless cellular telecommunication network, the wireless telecommunication devices being linked through a telecommunication network, characterised in that the method comprises the steps executed by the second wireless telecommunication device of:

receiving through the telecommunication network, a message comprising at least one information representative of a time to transfer or receive a predetermined radio signal by the second wireless telecommunication device, determining at least from time of reception of the message and from the time to transfer or receive the predetermined radio signal if the collaboration session between the first and the second wireless telecommunication may be established.

The present invention concerns also a device for determining if a collaboration session may be established between a first wireless telecommunication device and a second wireless telecommunication device of a wireless cellular telecommunication network, the wireless telecommunication devices being linked through a telecommunication network, characterised in that the device for determining if a collaboration session may be established is included in the second wireless telecommunication device and comprises:

means for receiving through the telecommunication network, a message comprising at least one information representative of a time to transfer or receive a predetermined radio signal by the second wireless telecommunication device, means for determining at least from time of reception of the message and from the time to transfer or receive the predetermined radio signal if the collaboration session between the first and the second wireless telecommunication may be established.

Thus, the conditions through the telecommunication network of the link between the wireless telecommunication devices can be evaluated. It is possible to determine if an information can be sent to the at least one second wireless telecommunication device in a given time. It is also possible to determine if information can be transferred through a radio path and received by a mobile terminal within a given time. It is then possible to determine if a coordination session can be established, with a simple protocol between the wireless telecommunication devices.

According to a particular feature, the second wireless telecommunication device:

compares the information representative of time to transfer the predetermined radio signal to the time of reception of the message, determines if radio signal has to be transferred at time to transfer at least according to the comparison.

Thus, if the second wireless telecommunication device does not receive the message through the telecommunication network or if the time to transfer the predetermined radio signal is prior to the time of reception of the message, the second wireless telecommunication device deduces that no coordination can be established with said first wireless telecommunication device. By not transferring radio signal, the second wireless telecommunication device stops the cooperation procedure as earliest.

According to a particular feature, the determination if radio signal has to be transferred at time to transfer is further dependent of the second wireless telecommunication device capability of collaborating and/or the second wireless telecommunication current load situation and/or the second wireless telecommunication device capacity and/or configuration of the second wireless telecommunication device for accepting or refusing to participate to a coordination session and/or according to a schedule.

Thus, only the second wireless telecommunication device allowed or ready to collaborate will transfer the predetermined radio signal and then may be identified at the first wireless telecommunication device.

According to a particular feature, the first wireless telecommunication device determines if the coordination session is established with the second wireless telecommunication device from the predetermined radio signals received by the first wireless telecommunication device.

Thus, the radio signal strength can be used for evaluating the radio path quality between the first and the second wireless telecommunication devices.

According to a particular feature, the first wireless telecommunication device:

selects at least one predetermined radio signal from the received predetermined radio signals, identifies the second wireless telecommunication device which transferred the selected predetermined radio signal.

Thus, the first wireless telecommunication device can draw a list of candidates wireless telecommunication device for coordination.

According to a particular feature, the first wireless telecommunication device determines if the coordination session is established with the second wireless telecommunication device from at least one measurement report transferred by at least one mobile terminal receiving the predetermined radio signals.

Thus, the selection of a second wireless telecommunication device can be done for a particular mobile terminal, which will be the main recipient of the coordination advantage. Furthermore, a different second wireless telecommunication device can be selected per mobile terminal.

According to a particular feature, the first wireless telecommunication device transfers to at least one mobile terminal handled by the first wireless telecommunication device a request to proceed to at least one measurement on at least one predetermined signal.

Thus, the mobile terminals know the transmission time of predetermined signals and do not need to monitor it all the time.

According to a particular feature, the second wireless telecommunication device:

compares the information representative of time to receive the predetermined radio signal to the time of reception of the message, determines if in response to the received radio signal, a message intended to the first wireless telecommunication device has to be transferred according to the comparison.

Thus, if the second wireless telecommunication device does not receive the message through the telecommunication network or if the time to receive the predetermined radio signal is prior to the time of reception of the message, the second wireless telecommunication device deduces that no coordination can be established with said first wireless telecommunication device.

By not transferring a message, the second wireless telecommunication device stops the cooperation procedure as earliest.

According to a particular feature, the determination if a message intended to the first wireless telecommunication device has to be transferred is further dependent of the second wireless telecommunication device capability of collaborating and/or the second wireless telecommunication current load situation and/or the second wireless telecommunication device capacity and/or configuration of the second wireless telecommunication device for accepting or refusing to participate to a coordination session and/or according to a schedule.

Thus, only the second wireless telecommunication device allowed or ready to collaborate will transfer the predetermined radio signal and then may be identified at the first wireless telecommunication device.

According to a particular feature, the first wireless telecommunication device transfers to at least one mobile terminal handled by the first wireless telecommunication device a request to transfer the predetermined radio signal, the predetermined signal comprising at least information identifying the first wireless telecommunication device.

According to a particular feature, the first wireless telecommunication device determines if the coordination session is established with the second wireless telecommunication device from at least one measurement report transferred by the second telecommunication device.

According to a particular feature, the wireless cellular telecommunication network further comprises an access gateway linked to plural wireless telecommunication devices through the communication network and the message is transferred by the first wireless telecommunication device to the access gateway and the access gateway selects at least a part of the wireless telecommunication devices linked to the access gateway and transfers the message to the selected wireless telecommunication devices.

Thus, if the wireless cellular telecommunication network comprises many wireless telecommunication devices such as relays, home base stations and/or base stations may be grouped into subsets of wireless telecommunication devices linked by an access gateway, the connectivity between wireless telecommunication devices is done thanks to the access gateway with good performance.

Furthermore, the first wireless telecommunication device does not have to know precisely the second wireless telecommunication devices before having executed the coordination process.

The connections of wireless telecommunication devices of a subset of wireless telecommunication devices with the remaining part of the wireless cellular telecommunication network is made through the access gateway. The remaining part of the wireless cellular telecommunication network does not need to be aware of each wireless telecommunication device of a subset of wireless telecommunication devices.

This is particularly profitable when the operation state of the wireless telecommunication devices may vary in time.

According to a particular feature, information representative of time to transfer or receive the predetermined radio signal is a time or a given radio frame number during a given duration.

Thus, the radio frame index can be chosen such as to fit with the scheduler memory of the first wireless telecommunication device, such as if the second wireless telecommunication device cannot cooperate at the determined radio frame, it will not send the predetermined radio signal or a message and can not be identified by the first wireless telecommunication device.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and apparatus according to the invention, they will not be repeated here.

The characteristics of the invention will emerge more clearly from a reading of the following description of an example of embodiment, the said description being produced with reference to the accompanying drawings, among which:

DETAILED DESCRIPTION

Figure 1A:
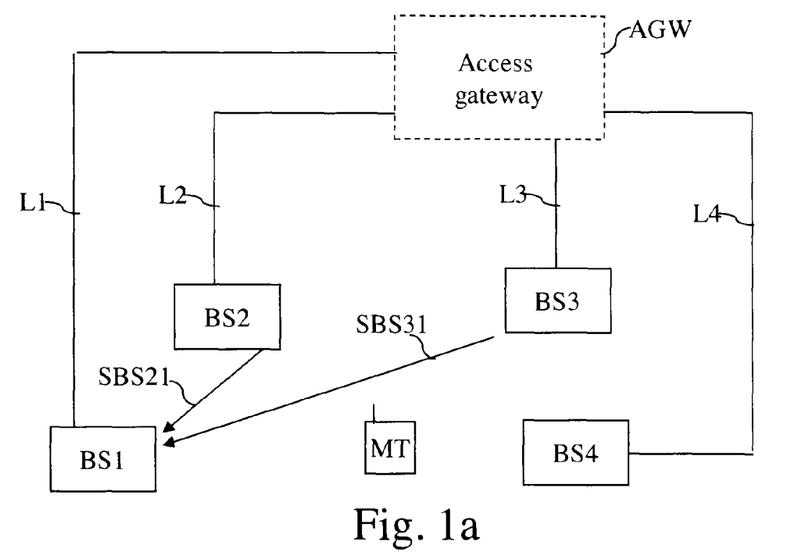
FIG. 1a represents a wireless cellular telecommunication network in which the present invention is implemented according to a first mode of realisation of the present invention.

FIG. 1a represents a wireless cellular telecommunication network in which the present invention is implemented according to a first mode of realisation of the present invention.

In FIG. 1, four wireless telecommunication devices BS1, BS2, BS3 and BS4 of a wireless cellular telecommunication network are shown.

Four wireless telecommunication devices BS are shown but we can understand that the present invention works when a different, e.g., more important, number of wireless telecommunication devices BS exists in the wireless cellular telecommunication network.

The wireless telecommunication devices BS may be for example base stations or home base stations or relays or a combination of base stations, relays and home base stations.

The wireless telecommunication devices BS, when they are home base stations or relays, are for example located at home.

Each home base station is like a base station which cell coverage is limited to few hundreds square meters and which may enable a reduced number of mobile terminals associated to the home base station to access the wireless cellular telecommunication network.

Each relay may enable mobile terminals associated to the relay to access the wireless cellular telecommunication network. For example, relays transmit signals through a downlink channel to mobile terminals and receive signals from mobile terminals through an uplink channel as if they were classic base stations or home base stations. However, unlike a base station or a home base station which has a wired connection to a telecommunication network, the relay only has a wireless connection with a base station or a home base station and its connection to the telecommunication network is done via the base station or the home base station.

The wireless telecommunication devices BS are able to receive signals transferred by mobile terminals MT which are located in the cell, not shown in FIG. 1, they respectively manage. The wireless telecommunication devices BS transfer signals which can be received and processed by mobile terminals MT located in the cell they respectively manage.

When a wireless telecommunication device BS handles a mobile terminal MT, the mobile terminal MT can receive, establish or continue a communication with a remote telecommunication device.

Only one mobile terminal MT is shown in FIG. 1a but we can understand that the present invention works when a different, e.g., more important, number of mobile terminal MT exists in the wireless cellular telecommunication network.

An access gateway AGW may be included in the wireless cellular telecommunication network.

The access gateway AGW may interface at least a part of the wireless telecommunication devices BS with the remaining devices of the wireless cellular telecommunication network.

For example, the access gateway AGW interfaces the wireless telecommunication devices BS1, BS2, BS3 and BS4 with the remaining devices of the wireless cellular telecommunication network.

The access gateway AGW may determine to which wireless telecommunication device BS located in the area managed by the access gateway AGW, a message transferred by a wireless telecommunication device has to be transferred.

One or plural access gateways AGW are included in the wireless cellular telecommunication network for example when the wireless telecommunication devices are relays or home base stations.

For example, when the wireless telecommunication devices BS are base stations, an access gateway AGW is not included in the wireless cellular telecommunication network.

The wireless telecommunication devices BS1 to BS4 may be linked by the communication network if the wireless telecommunication devices BS are base stations or home base stations.

The communication network is for example, a PSTN network (Public Switch Telecommunication Network) or a packet switched network like an ISDN (Integrated Services Digital Network) network, or an optical fibre based telecommunication network, etc.

The link L1 represents the connection link established between the wireless telecommunication device BS1 and the access gateway AGW.

The link L2 represents the connection link between the wireless telecommunication device BS2 and the access gateway AGW.

The link L3 represents the connection link between the wireless telecommunication device BS3 and the access gateway AGW.

The link L4 represents the connection link established between the wireless telecommunication device BS4 and the access gateway AGW.

The links L1, L2 L3 and L4 are, when the wireless telecommunication devices BS are base stations or home base stations, established through the communication network.

The links L1, L2 L3 and L4 comprise, when the wireless telecommunication devices are relays, a wireless connection between the relays and a respective base station or home base station not shown in FIG. 1a and a connection established from the base station or home base station through the communication network to the access gateway AGW.

The arrow noted SBS21 represents the wireless path from the wireless telecommunication device BS2 to the wireless telecommunication device BS1.

The arrow noted SBS31 represents the wireless path from the wireless telecommunication device BS3 to the wireless telecommunication device BS1.

According to the first mode of realisation of the present invention, at least one wireless telecommunication device:
receives through the telecommunication network, a message comprising at least one information representative of a time to transfer a predetermined radio signal by the wireless telecommunication device,
determines at least from time of reception of the message and from the time to transfer the predetermined radio signal if a collaboration session between the wireless telecommunication device and another wireless telecommunication may be established.

The other wireless telecommunication device determines if the coordination session is established with the wireless telecommunication device from the predetermined radio signals it receives.

Figure 1B:
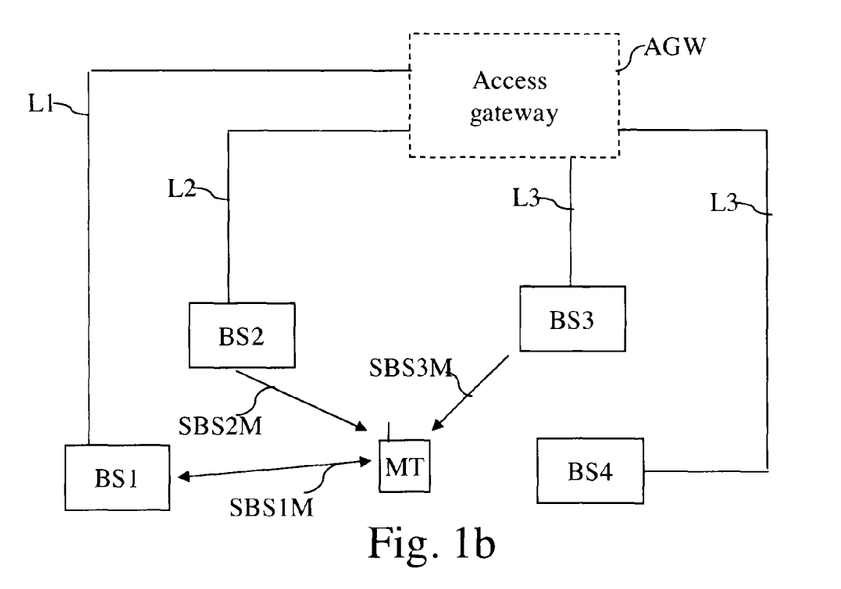
FIG. 1b represents a wireless cellular telecommunication network in which the present invention is implemented according to a second mode of realisation of the present invention.

FIG. 1b represents a wireless cellular telecommunication network in which the present invention is implemented according to a second mode of realisation of the present invention.

The FIG. 1b is almost identical to the FIG. 1a except that the wireless paths SBS21 and SBS31 are replaced by the wireless paths SBS2M, SBS3M and SBSM1.

The arrow noted SBS2M represents the wireless path from the wireless telecommunication device BS2 to the mobile terminal MT.

The arrow noted SBS3M represents the wireless path from the wireless telecommunication device BS2 to the mobile terminal MT.

The arrow noted SBS1M represents the wireless path between the wireless telecommunication device BS1 and the mobile terminal MT.

According to the second mode of realisation of the present invention, at least one wireless telecommunication device:
receives through the telecommunication network, a message comprising at least one information representative of a time to transfer a predetermined radio signal by the wireless telecommunication device,
determines at least from time of reception of the message and from the time to transfer the predetermined radio signal if a collaboration session between the wireless telecommunication device and another wireless telecommunication may be established.

The other wireless telecommunication device determines if the coordination session is established with the wireless telecommunication device from at least one measurement report received from at least one mobile terminal MT.

Figure 1C:
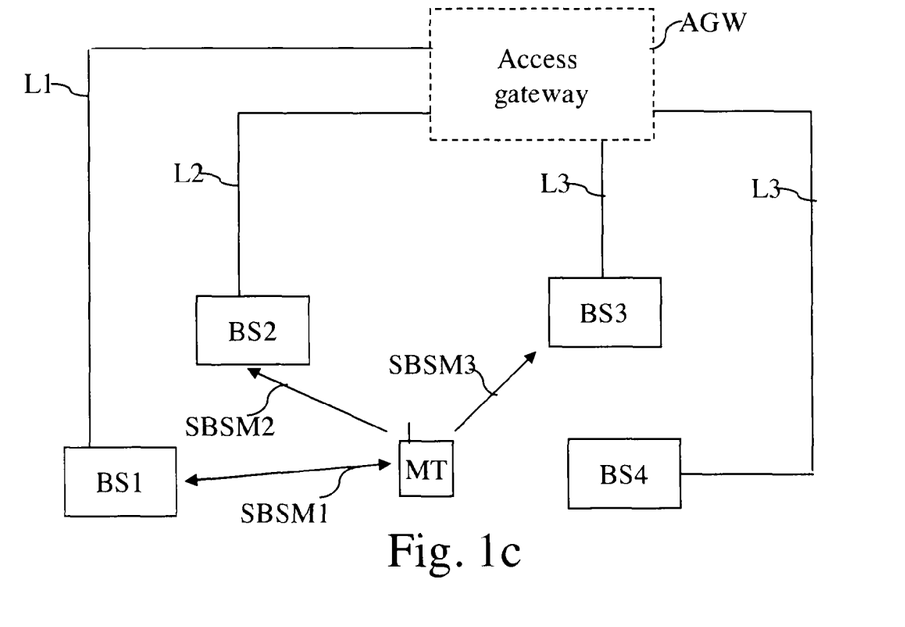
FIG. 1c represents a wireless cellular telecommunication network in which the present invention is implemented according to a third mode of realisation of the present invention.

FIG. 1c represents a wireless cellular telecommunication network in which the present invention is implemented according to a third mode of realisation of the present invention.

The FIG. 1c is almost identical to the FIG. 1a except that the wireless paths SBS21 and SBS31 are replaced by the wireless paths SBSM2, SBSM 3 and SBSM1.

The arrow noted SBSM2 represents the wireless path from the mobile terminal MT to the wireless telecommunication device BS2.

The arrow noted SBS3M represents the wireless path from the mobile terminal MT to the wireless telecommunication device BS2.

The arrow noted SBS1M represents the wireless between the wireless telecommunication device BS1 and the mobile terminal MT.

According to the third mode of realisation of the present invention, at least one wireless telecommunication device:
receives through the telecommunication network, a message comprising at least one information representative of a time to receive a predetermined radio signal by the wireless telecommunication device,
determines at least from time of reception of the message and from the time to receive the predetermined radio signal if a collaboration session between the wireless telecommunication device and another wireless telecommunication may be established.

Figure 2:
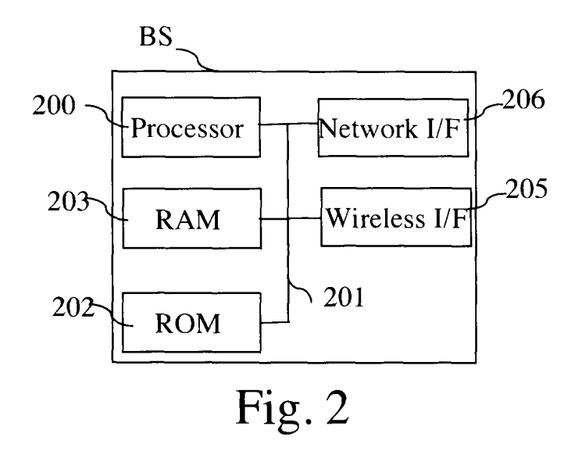
FIG. 2 is a diagram representing the architecture of a base station in which the present invention is implemented.

FIG. 2 is a diagram representing the architecture of a wireless telecommunication device in which the present invention is implemented.

Figure 4A:
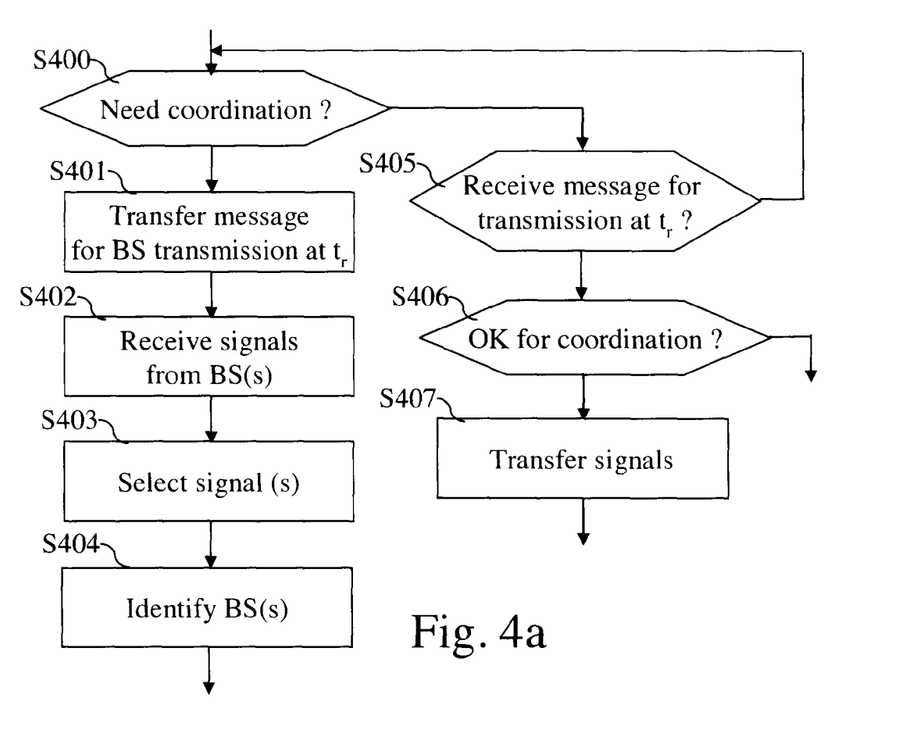
FIG. 4a discloses an example of an algorithm executed by a wireless telecommunication device according to the first mode of realisation of the present invention.
Figure 4B:
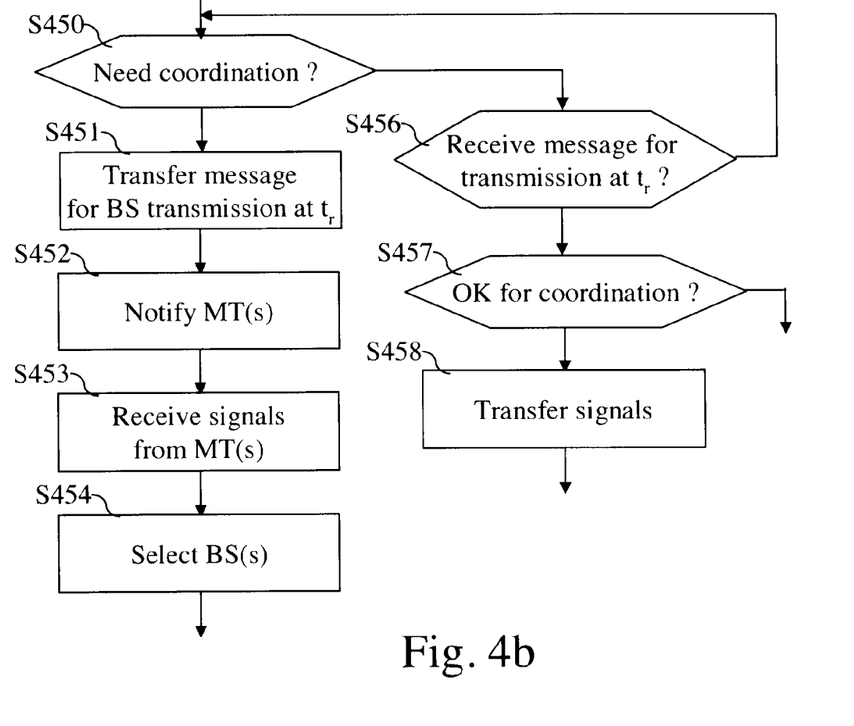
FIG. 4b discloses an example of an algorithm executed by a wireless telecommunication device according to the second mode of realisation of the present invention.
Figure 4C:
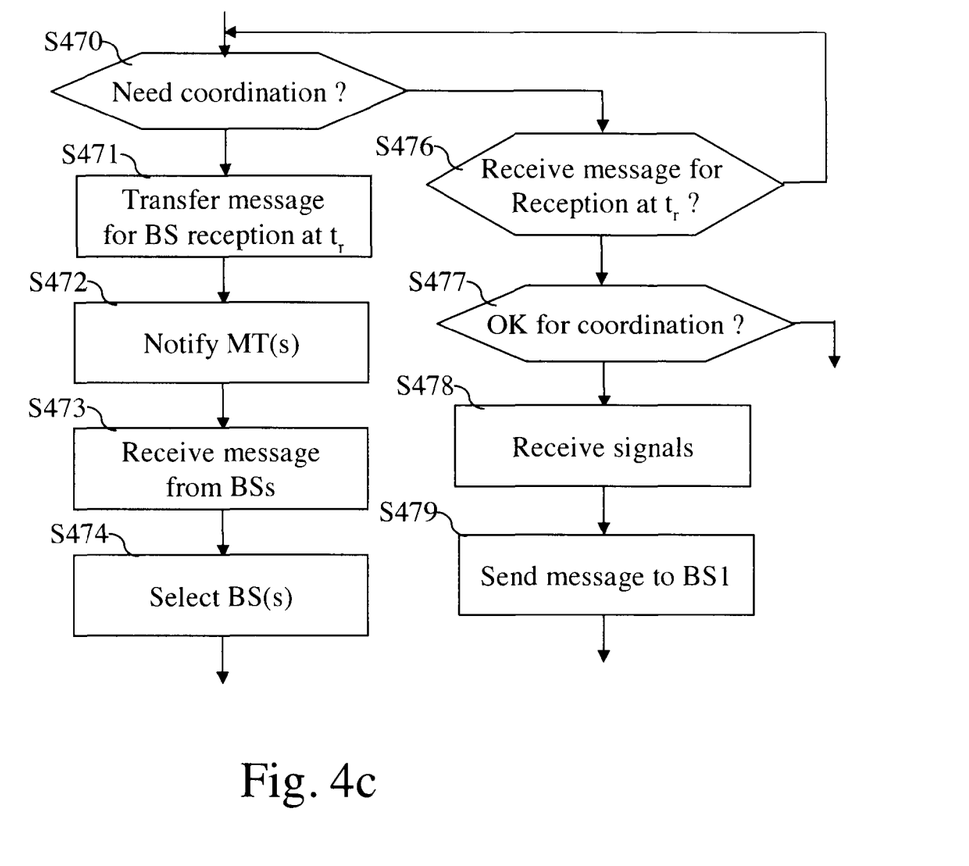
FIG. 4c discloses an example of an algorithm executed by a wireless telecommunication device according to the third mode of realisation of the present invention.

The wireless telecommunication device BS has, for example, an architecture based on components connected together by a bus 201 and a processor 200 controlled by the program as disclosed in FIG. 4a or 4b or 4c.

It has to be noted here that, instead of being based on a processor, the architecture of the wireless telecommunication device BS may be based on dedicated integrated circuits.

The bus 201 links the processor 200 to a read only memory ROM 202, a random access memory RAM 203, a wireless interface 205 and a network interface 206.

The memory 203 contains registers intended to receive variables and the instructions of the program related to the algorithm as disclosed in FIG. 4a or 4b or 4c.

The processor 200 controls the operation of the network interface 206 and of the wireless interface 205.

The read only memory 202 contains instructions of the program related to the algorithms as disclosed in FIG. 4a or 4b or 4c, which are transferred, when the wireless telecommunication device BS is powered on, to the random access memory 203.

When the wireless telecommunication device BS is a base station or home base station, the wireless telecommunication device BS is connected to a telecommunication network through the network interface 206. For example, the network interface 206 is a DSL (Digital Subscriber Line) modem, or an ISDN (Integrated Services Digital Network) interface, etc.

Through the network interface 206, the wireless telecommunication device BS may transfer messages to other wireless telecommunication devices BS or to the access gateway AGW or to core devices of the wireless cellular telecommunication network.

The wireless interface 205 and the network interface 206 are the resources of the wireless telecommunication device BS that may be used by a mobile terminal in order to access the wireless cellular telecommunication network when the mobile terminal is served by the wireless telecommunication device BS, i.e. establishes or receives or continues a communication with a remote telecommunication device.

The wireless interface 205 comprises at least downlink transmission module and an uplink reception module for transferring and receiving signals to and from mobile terminals.

According to the first mode of realisation, the wireless interface 205 further comprises an uplink reception module for receiving signals from other wireless telecommunication devices BS.

When the wireless telecommunication device BS is a relay, the wireless interface 205 further comprises a downlink transmission module and an uplink reception module for transferring and receiving signals to and from a base station or a home base station.

Figure 3:
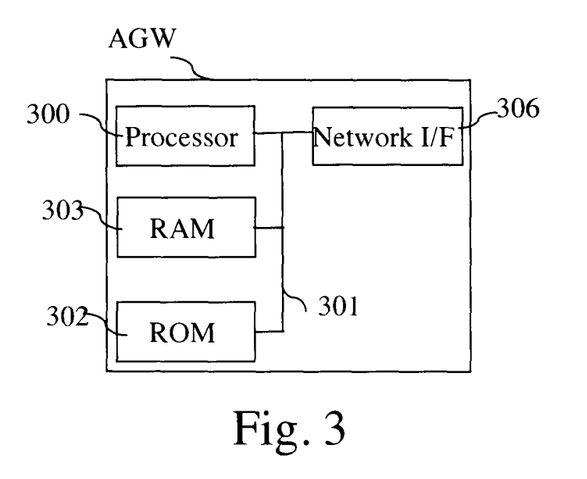
FIG. 3 is a diagram representing the architecture of an access gateway in which the present invention is implemented.

FIG. 3 is a diagram representing the architecture of an access gateway in which the present invention is implemented.

Figure 5:
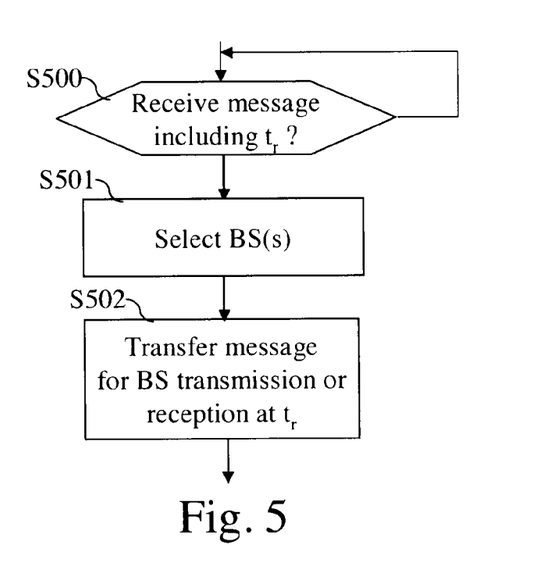
FIG. 5 discloses an example of an algorithm executed by an access gateway according to the present invention.

The access gateway AGW has, for example, an architecture based on components connected together by a bus 301 and a processor 300 controlled by the program as disclosed in FIG. 5.

It has to be noted here that, instead of being based on a processor, the architecture of the coordinator may be based on dedicated integrated circuits.

The bus 301 links the processor 300 to a read only memory ROM 302, a random access memory RAM 303 and a network interface 306.

The memory 303 contains registers intended to receive variables and the instructions of the program related to the algorithm as disclosed in FIG. 5.

The processor 300 controls the operation of the network interface 306.

The read only memory 302 contains instructions of the program related to the algorithm as disclosed in FIG. 5, which are transferred, when the access gateway AGW is powered on, to the random access memory RAM 303.

The access gateway AGW is connected to a telecommunication network through the network interface 306. For example, the network interface 306 is a DSL (Digital Subscriber Line) modem, or an ISDN (Integrated Services Digital Network) interface, etc.

Through the network interface 306, the access gateway AGW may transfer messages to wireless telecommunication devices BS of the wireless cellular telecommunication network or to core network devices of the wireless cellular telecommunication network not shown in FIG. 1a or 1b.

It has to be noted here that in a variant, the access gateway AGW may be included into at least one wireless telecommunication device BS or in a core network device of the wireless cellular telecommunication network.

FIG. 4a discloses an example of an algorithm executed by a wireless telecommunication device according to the first mode of realisation of the present invention.

More precisely, the present algorithm is executed by each wireless telecommunication device BS.

The present algorithm will be disclosed in an example wherein it is executed by the processor 200 of the wireless telecommunication device BS1.

At step S400, the processor 200 checks if a coordination session needs to be established.

A coordination session is, for example, the transmission of the flow of data by plural wireless telecommunication devices BS. In that case, the same data may be transmitted in parallel by different wireless telecommunication devices or the flow of data may be divided into plural sub-flows of data, each being transferred by a respective wireless telecommunication device BS.

A coordination session is, in another example, related to the scheduling of data in order to reduce interferences observed at a mobile terminal side from two wireless telecommunication devices BS or observed at a wireless telecommunication BS side between two mobile terminals MT from two different cells. For example, the coordination session allows to decide which physical resource blocks are allocated to mobile terminals MT and with which transmit power.

A physical resource block is the basic time frequency resource available for data transmission. The PRB consists of a fixed number of adjacent ODFM (Orthogonal Frequency Division Multiplexing) sub-carriers and represents the minimum scheduling resolution in the frequency domain.

In some Coordinated Multi-Point modes, wireless telecommunication devices BS involved in a coordination session shall share a common time reference, be neighbour from the radio point of view so as a mobile terminal MT can communicate with them at the same time with good radio channel conditions.

If a coordination session needs to be established, the processor 200 moves to step S401. Otherwise, the processor 200 moves to step S405.

At step S401, the processor 200 commands the transfer of a message through the network interface 206. The message is a request to send, by the wireless telecommunication device or devices BS which will receive the message, a predetermined radio signal at a given time $t_r$ or at a given radio frame number, during a given duration.

If an access gateway AGW is comprised in the wireless cellular telecommunication network, the message is transferred to the access gateway AGW through the link L1. If no access gateway AGW is comprised in the wireless cellular telecommunication network, the message is transferred to a core network device of the wireless cellular telecommunication network or to wireless telecommunication devices BS known by the processor 200 of the wireless telecommunication device BS1.

At next step S402, the processor 200 detects the reception, through the wireless interface 205, of at least one predetermined signal transferred by at least one wireless telecommunication device BS in response to the message transferred at step S401.

For example, the wireless telecommunication devices BS2 and BS3 transfer predetermined signals at time $t_r$.

The predetermined signals are discriminated by the wireless interface 205 thanks to any standard coherent or non coherent detection technique.

For example, the processor 200 identifies the physical cell identifier comprised in each received predetermined signal.

According to a particular mode of realisation of the present invention, the predetermined signal may comprise information representative of the resources that the wireless telecommunication device BS which sent the predetermined signal is ready to allocate for the coordination session.

At next step S403, the processor 200 selects among the predetermined signals transferred by wireless telecommunication devices BS2 and BS3, at least one predetermined signal.

For that, the processor 200 evaluates the quality of service provided by the wireless telecommunication device BS which sent the predetermined signal. The quality of service is evaluated for example, from the received power signal strength or the signal plus noise interference ratio or from the time interval between the reception of the time $t_r$ and the time of reception of the predetermined signal or from the information representative of the resources that the wireless telecommunication device which sent the predetermined signal is ready to allocate for the coordination session or any other radio metric used to evaluate the link quality/strength between the wireless telecommunication device BS1 and the wireless telecommunication devices BS2 and BS3 which sent the predetermined signals.

It has to be noted here that the quality of service may be evaluated on PRB basis.

For example, the processor 200 selects the predetermined signal transferred by the wireless telecommunication device BS2.

At next step S404, the processor 200 identifies the at least one wireless telecommunication device which has sent the at least one selected signal.

For that, the wireless interface 205 may decode periodic beacons signals having the physical cell identifier of the selected signal and may complete the identification of the at least one wireless telecommunication device BS2 from beacons content.

The processor 200 notifies the identified wireless telecommunication device BS2 of the establishment of the coordination session.

The coordination session is then started.

At step S405, the processor 200 checks if a request to send a predetermined radio signal at a given time $t_r$ or at a given radio frame number, during a given duration is received. The message is as the one disclosed at step S401.

If a request to send radio signal is received, the processor 200 moves to step S406. Otherwise, the processor 200 returns to step S400.

At step S406, the processor 200 checks if the wireless telecommunication device BS is available for a coordination session.

For example, the processor 200 checks if the time of reception of the message is upper or equal to or almost equal to the time tr.

The processor 200 may also consider other criteria from the decision of availability for the coordination session.

For example, criteria is or are the wireless telecommunication device capability of collaborating and/or the wireless telecommunication current load situation and/or the wireless telecommunication device capacity and/or the wireless telecommunication device has been configured to accept or refuse to participate to a coordination session and/or according to a time schedule. For example, the configuration to accept or refuse to participate to a coordination session is made by the operator of the wireless telecommunication network or by the holder of the home in which the home base station or relay is located.

If the wireless telecommunication device BS is available for a coordination session, the processor 200 moves to step S407. Otherwise, the processor 200 returns to step S400.

At step S407, the processor 200 commands the wireless interface 205 to transfer at a given time $t_r$ or at a given radio frame number, during a given duration, the predetermined radio signal.

The predetermined signal contains the physical cell identifier of the wireless telecommunication device.

According to a particular mode of realisation of the present invention, the signal may comprise information representative of the resources that the wireless telecommunication device is ready to allocate for the coordination session.

FIG. 4*b* discloses an example of an algorithm executed by a wireless telecommunication device according to the second mode of realisation of the present invention.

More precisely, the present algorithm is executed by each wireless telecommunication device BS.

The present algorithm will be disclosed in an example wherein it is executed by the processor 200 of the wireless telecommunication device BS1.

The present algorithm may be executed in parallel for each mobile terminal MT handled by the wireless telecommunication device BS or for each mobile terminal MT handled by the wireless telecommunication device BS and located at the border of the cell of the wireless telecommunication device BS.

The steps S450, S451, S456, S457 and S458 are identical to the respective steps S400, S401, S405, S406 and S407, they will not be disclosed anymore.

At step S452, the processor 200 commands the wireless interface to transfer a message notifying at least one mobile terminal MT to proceed to some measurement on predetermined radio signals during a time window around time $t_r$ or around a frame number. Some margin could be introduced to take into account time mis-synchronisation difference between each mobile terminal MT and wireless telecommunication devices which may transfer predetermined signals.

At step S453, the processor 200 detects the reception, through the wireless interface 205, of at least one measurement report transferred by at least one mobile terminal MT in response to the message transferred at step S452.

The measurement report comprises information related to signals transferred by at least one wireless telecommunication device BS as disclosed at step S407 of FIG. 4*a* together with the corresponding physical cell identifiers comprised in the signals measured by the at least one mobile terminal MT.

At next step S454, the processor 200 selects using the measurement report at least one wireless telecommunication device.

For that, the processor 200 evaluates the quality of service provided by the wireless telecommunication device BS which sent the signal identified in the measurement report. The quality of service is evaluated for example, from the received power signal strength or the signal plus noise interference ratio or any other radio metric used to evaluate the link quality/strength between the mobile terminal MT BS1 and the wireless telecommunication devices BS2 and BS3 which sent the received signals.

It has to be noted here that the quality of service may be evaluated on PRB basis.

For example, the processor 200 selects the wireless telecommunication device BS2.

The processor 200 notifies the identified wireless telecommunication device BS2 of the establishment of the coordination session.

The coordination session is then started.

FIG. 4*c* discloses an example of an algorithm executed by a wireless telecommunication device according to the third mode of realisation of the present invention.

More precisely, the present algorithm is executed by each wireless telecommunication device BS.

The present algorithm will be disclosed in an example wherein it is executed by the processor 200 of the wireless telecommunication device BS1.

The present algorithm may be executed in parallel for each mobile terminal MT handled by the wireless telecommunication device BS or for each mobile terminal MT handled by the wireless telecommunication device BS and located at the border of the cell of the wireless telecommunication device BS.

At step S470, the processor 200 checks if a coordination session needs to be established.

If a coordination session needs to be established, the processor 200 moves to step S471. Otherwise, the processor 200 moves to step S476.

At step S401, the processor 200 commands the transfer of a message through the network interface 206. The message is a request to receive, by the wireless telecommunication device or devices BS which will receive the message, a predetermined radio signal at a given time $t_r$ or at a given radio frame number, during a given duration.

If an access gateway AGW is comprised in the wireless cellular telecommunication network, the message is transferred to the access gateway AGW through the link L1. If no access gateway AGW is comprised in the wireless cellular telecommunication network, the message is transferred to a core network device of the wireless cellular telecommunication network or to wireless telecommunication devices BS known by the processor 200 of the wireless telecommunication device BS1.

At step S472 the processor 200 commands the wireless interface to transfer a message notifying at least one mobile terminal MT to transfer a predetermined radio signal during a time window around time $t_r$ or around a frame number. According to a particular feature, the predetermined radio signal comprises at least information identifying the first base station.

Some margin could be introduced to take into account time mis-synchronisation difference between the mobile terminal MT and wireless telecommunication devices which may receive the predetermined signal.

At step S473, the processor 200 detects the reception, through the wireless interface 205, of at least one message transferred by a wireless telecommunication network in response of the reception of predetermined radio signal or signals transferred by one or plural mobile terminals MT. According to a particular feature, the message may comprise information identifying the wireless telecommunication device BS which sends the message and a measurement report transferred by at least one wireless telecommunication device BS. According to a particular feature, the message may comprise a measurement report on the predetermined radio signals transferred by mobile terminals MT in combination with information identifying said mobile terminals MT.

At next step S454, the processor 200 selects using the measurement report at least one wireless telecommunication device.

For that, the processor 200 evaluates the quality of service provided by the wireless telecommunication device BS which sent the message. The quality of service is evaluated for example, from the received power signal strength or the signal plus noise interference ratio or any other radio metric used to evaluate the link quality/strength between the wireless telecommunication device BS which sent the message and the mobile terminal MT.

It has to be noted here that the quality of service may be evaluated on PRB basis.

For example, the processor 200 selects the wireless telecommunication device BS2.

The processor 200 notifies the identified wireless telecommunication device BS2 of the establishment of the coordination session.

The coordination session is then started.

At step S476, the processor 200 checks if a request to receive a predetermined radio signal at a given time $t_r$ or at a given radio frame number, during a given duration is received. The message is as the one disclosed at step S451.

If a request to receive a predetermined radio signal is received, the processor 200 moves to step S477. Otherwise, the processor 200 returns to step S470.

At step S477, the processor 200 checks if the wireless telecommunication device BS is available for a coordination session.

For example, the processor 200 checks if the time of reception of the message is upper or equal to or almost equal to the time tr.

The processor 200 may also consider other criteria from the decision of availability for the coordination session.

For example, criteria is or are the wireless telecommunication device capability of collaborating and/or the wireless telecommunication current load situation and/or the wireless telecommunication device capacity and/or the wireless telecommunication device has been configured to accept or refuse to participate to a coordination session and/or according to a time schedule. For example, the configuration to accept or refuse to participate to a coordination session is made by the operator of the wireless telecommunication network or by the holder of the home in which the home base station or relay is located.

If the wireless telecommunication device BS is available for a coordination session, the processor 200 moves to step S478. Otherwise, the processor 200 returns to step S470.

At step S478, the processor 200 commands the wireless interface 205 in order to receive at a given time $t_r$ or at a given radio frame number, during a given duration at least one predetermined radio signal.

At next step S479, the processor 200 commands the transfer, through the network interface 205, of a message as the one disclosed at step S473.

FIG. 5 discloses an example of an algorithm executed by an access gateway according to the present invention.

More precisely, the present algorithm is executed by the processor 300 of the access gateway AGW.

At step S500, the processor 300 checks if a request to send or receive a predetermined radio signal at a given time $t_r$ or at a given radio frame number, during a given duration is received. The message is as the one disclosed at step S401 or S471.

If a request to send or receive a predetermined radio signal is received, the processor 300 moves to step S501. Otherwise, the processor 300 returns to step S500.

At next step S501, the processor 300 selects at least one wireless telecommunication device BS to which the received message has to be forwarded.

For example, the processor 300 selects each wireless telecommunication device BS, except the wireless telecommunication device BS which sent the message received at step S500, which is connected to the access gateway AGW through the communication network.

Other criteria may also introduced, such as the telecommunication network topology a priori knowledge at the access gateway AGW.

At next step S502, the processor 300 commands the transfer of a message through the network interface 206 to each selected wireless telecommunication device BS. The message is a request to send or receive, by the wireless telecommunication device or devices which will receive the message, a predetermined radio signal at a given time $t_r$ or at a given radio frame number, during a given duration.

After that, the processor 300 returns to step S500.

Naturally, many modifications can be made to the embodiments of the invention described above without departing from the scope of the present invention.

The invention claimed is:

1. A method for determining if a collaboration session may be established between a first wireless telecommunication device and a second wireless telecommunication device of a wireless cellular telecommunication network, the wireless telecommunication devices being linked through a telecommunication network,
wherein the method comprises the steps executed by the second wireless telecommunication device of:
receiving through the telecommunication network, a message including at least one information representative of a time to transfer or receive a predetermined radio signal by the second wireless telecommunication device,
determining at least from time of reception of the message and from the time to transfer or receive the predetermined radio signal if a collaboration session between the first and the second wireless telecommunication devices may be established.

2. The method according to claim 1,
wherein the second wireless telecommunication device executes the steps of:
comparing the information representative of time to transfer the predetermined radio signal to the time of reception of the message,
determining if radio signal has to be transferred at time to transfer at least according to the comparison.

3. The method according to claim 2,
wherein the determination if radio signal has to be transferred at time to transfer is further dependent of the second wireless telecommunication device capability of collaborating and/or the second wireless telecommunication current load situation and/or the second wireless telecommunication device capacity and/or configuration of the second wireless telecommunication device for accepting or refusing to participate in a coordination session and/or according to a schedule.

4. The method according to claim 1,
wherein the method comprises further step executed by the first wireless telecommunication device of determining if a coordination session is established with the second wireless telecommunication device from the predetermined radio signals received by the first wireless telecommunication device.

5. The method according to claim 4,
wherein the method further comprises the steps executed by the first wireless telecommunication device of:
selecting at least one predetermined radio signal from the received predetermined radio signals,
identifying the second wireless telecommunication device which transferred the selected predetermined radio signal.

6. The method according to the claim 1,
wherein the method comprises further step executed by the first wireless telecommunication device of determining if a coordination session is established with the second wireless telecommunication device from at least one measurement report transferred by at least one mobile terminal receiving the predetermined radio signals.

7. The method according to claim 6,
wherein the method comprises further step of transferring to at least one mobile terminal handled by the first wireless telecommunication device a request to proceed to at least one measurement on at least one predetermined signal.

8. The method according to claim 1,
wherein the second wireless telecommunication device executes the steps of:
comparing the information representative of time to receive the predetermined radio signal to the time of reception of the message,
determining if in response to the received radio signal, a message intended to the first wireless telecommunication device has to be transferred according to the comparison.

9. The method according to claim 8,
wherein the determination if a message intended to the first wireless telecommunication device has to be transferred is further dependent of the second wireless telecommunication device capability of collaborating and/or the second wireless telecommunication current load situation and/or the second wireless telecommunication device capacity and/or configuration of the second wireless telecommunication device for accepting or refusing to participate in a coordination session and/or according to a schedule.

10. The method according to claim 9,
wherein, when a collaboration session is established, the method comprises a final step executed by the first wireless telecommunication device of transferring to at least one mobile terminal handled by the first wireless telecommunication device a request to transfer the predetermined radio signal, the predetermined signal comprising at least information identifying the first wireless telecommunication device.

11. The method according to claim 8,
wherein the method comprises further step executed by the first wireless telecommunication device of determining if a coordination session is established with the second wireless telecommunication device from at least one measurement report transferred by the second telecommunication device.

12. The method according to claim 1,
wherein the wireless cellular telecommunication network further comprises an access gateway linked to plural wireless telecommunication devices through the communication network and in that the message is transferred by the first wireless telecommunication device to the access gateway and the access gateway selects at least a part of the wireless telecommunication devices linked to the access gateway and transfers the message to the selected wireless telecommunication devices.

13. The method according to claim 1,
wherein information representative of time to transfer or receive the predetermined radio signal is a time or a given radio frame number during a given duration.

14. A device for determining if a collaboration session may be established between a first wireless telecommunication device and a second wireless telecommunication device of a wireless cellular telecommunication network, the wireless telecommunication devices being linked through a telecommunication network,
wherein the device for determining if a collaboration session may be established is included in the second wireless telecommunication device and comprises:
means for receiving through the telecommunication network, a message including at least one information representative of a time to transfer or receive a predetermined radio signal by the second wireless telecommunication device,
means for determining at least from time of reception of the message and from the time to transfer or receive the predetermined radio signal if a collaboration session between the first and the second wireless telecommunication may be established.

15. A device for determining if a collaboration session may be established between a first wireless telecommunication device and a second wireless telecommunication device of a wireless cellular telecommunication network, the wireless telecommunication devices being linked through a telecommunication network, wherein the device for determining if a collaboration session may be established is included in the second wireless telecommunication device and comprises:

a network interface for receiving through the telecommunication network, a message including at least one information representative of a time to transfer or receive a predetermined radio signal by the second wireless telecommunication device, and a processor for determining at least from time of reception of the message and from the time to transfer or receive the predetermined radio signal if a collaboration session between the first and the second wireless telecommunication may be established.

* * * * *